(12) United States Patent
Brooke

(10) Patent No.: US 8,033,435 B1
(45) Date of Patent: Oct. 11, 2011

(54) MOBILE PLAN HOLDER

(76) Inventor: Steven A. Brooke, Newport, MN (US)

(*) Notice: Subject to any disclaimer, the term of this patent is extended or adjusted under 35 U.S.C. 154(b) by 977 days.

(21) Appl. No.: 11/951,577

(22) Filed: Dec. 6, 2007

(51) Int. Cl.
*B60R 7/00* (2006.01)
*A47B 37/00* (2006.01)

(52) U.S. Cl. .............. 224/404; 108/6; 108/44; 108/167; 224/487; 312/231; 312/241; 312/327

(58) Field of Classification Search .................. 224/404, 224/486, 487; 280/769; 108/6, 44, 67, 167; 312/241, 231, 327, 328
See application file for complete search history.

(56) References Cited

U.S. PATENT DOCUMENTS

| | | | |
|---|---|---|---|
| 1,366,652 A * | 1/1921 | Harrild | 224/487 |
| 2,882,641 A | 4/1959 | Young | |
| 4,236,461 A | 12/1980 | Barksdale | |
| 4,375,306 A | 3/1983 | Linder | |
| D305,632 S | 1/1990 | Kraklio | |
| 4,936,624 A * | 6/1990 | West | 296/37.6 |
| 5,121,306 A * | 6/1992 | Palmisano | 362/485 |
| 5,207,470 A * | 5/1993 | Rafi-Zadeh | 296/37.7 |
| 5,478,040 A | 12/1995 | Rellinger et al. | |
| 5,634,681 A | 6/1997 | Gionta | |
| 6,079,741 A * | 6/2000 | Maver | 280/759 |
| 6,467,417 B1 | 10/2002 | Guyot et al. | |
| 2003/0189074 A1* | 10/2003 | Dise | 224/404 |
| 2005/0092213 A1 | 5/2005 | Wilson et al. | |
| 2006/0071498 A1 | 4/2006 | Taylor | |
| 2006/0219746 A1 | 10/2006 | Kniffel et al. | |

* cited by examiner

*Primary Examiner* — Gary Elkins
(74) *Attorney, Agent, or Firm* — Kyle Fletcher

(57) ABSTRACT

The invention is a mobile blueprint holder wherein a box mounts along an interior side of a pickup truck bed. The box opens to allow the blueprint table to fold out where the blueprint table rests at an angle. When not in use the blueprints and the blueprint table fold away for safe storage. The blueprint table folds along the middle and contains a plurality of clips for holding a blueprint in place.

8 Claims, 3 Drawing Sheets

MOBILE PLAN HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of blueprint plan holder mechanisms, more specifically mobile plan holder devices.

B. Discussion of the Prior Art

As a preliminary note, it should be stated that there is an ample amount of prior art that deals with blueprint holding devices. As will be discussed immediately below, no prior art discloses a blueprint holder that folds out of a box from within the truckbed of a truck.

The Guyot et al. Patent (U.S. Pat. No. 6,467,417) discloses a folding side-mount work table for a vehicle. However, the work table of the Guyot Patent mounts to the underside of the truck bed, as opposed to the top, interior side of the truck bed. Furthermore, the vehicle table of the Guyot specifically suited for holding blueprints at an angled position.

The Gionta Patent (U.S. Pat. No. 5,634,681) discloses a truck-mounted work station including a spring biased work table. However, the work station is directed to a table that lays flat along the side of the truck, and does not include an enclosure box from which an angled surface folds out in order to review blueprints. Furthermore, the work station mounts to the exterior side of the vehicle, as opposed to the interior side of the truck bed.

The Kniffel et al. Patent Application Publication (U.S. Pub. No. 2006/0219746) discloses a vehicle storage-cargo box including drawers, shelves, and tables. However, the vehicle storage-cargo box of the Kniffel publication does not include an angled surface that folds out of a box that is mounted to the interior side of the truck bed, of which the angled surface can be used for reviewing blueprints and like plans.

The Taylor Patent Application Publication (U.S. Pub. No. 2006/0071498) discloses a cargo bed organizer for use with trucks including a fold-out table. However, the cargo bed organizer does not include an angled surface that folds out from within a storage box wherein the angled surface provides a place to review blueprints or like plans from the exterior side of the vehicle.

The Linder Patent (U.S. Pat. No. 4,375,306) discloses a storage unit for a vehicle including an external outward-sliding table. However, the outward-sliding table of the Linder Patent does not provide an angled surface for reviewing blueprints, and requires the use of a larger structure to be mounted to the truck bed.

The Barksdale Patent (U.S. Pat. No. 4,236,461) discloses a foldable and removable table with a hook-fastening means for use with vehicles. However, the foldable and removable table of the Barksdale Patent does not incline at an angle, which is ideal for reviewing blueprints, Furthermore, the table does not fold up inside of a sealed box when not in use, which provides a safe area to store blueprints when not in use.

The Wilson et al. Patent Application Publication (U.S. Pub. No. 2005/0092213) discloses a portable plan table for use with a truck having an element for mounting the table to a trailer hitch. However, the portable plan table of the Wilson publication does not include a storage box that is mounted along the interior-side of the truck bed from which the plan table folds into along with the blueprints when not in use.

The Young Patent (U.S. Pat. No. 2,882) discloses a blueprint holder stand having magnetic document retaining blocks. However, the blueprint holder stand of the Young Patent does not include a box from which the blueprint holder folds into, and nor does the patent direct its use to a side of a vehicle or pickup truck.

The Rellinger et al. Patent (U.S. Pat. No. 5,478,040) discloses a portable, collapsible easel having a spring clip for holding papers. However, the collapsible easel of the Rellinger Patent is not directed to supporting a blueprint at an angle along the side of a vehicle or pickup truck.

The Kraklio Patent (U.S. Pat. No. Des. 305,632) illustrates an ornamental design for a vehicle bumper-mounted foldable table.

In light of the above discussed prior art, there is a need for a blueprint plan holder that folds up into a box wherein the box mounts along the interior side of the pickup bed.

BRIEF SUMMARY OF THE INVENTION

The mobile blueprint holder includes a box that mounts along an interior side of a pickup truck bed. The box opens to allow the blueprint table to fold out where the blueprint table rests at an angle. When not in use the blueprints and the blueprint table fold away for safe storage. The blueprint table folds along the middle and contains a plurality of clips for holding a blueprint in place.

These together with additional objects, features and advantages of the mobile blueprint holder will be readily apparent to those of ordinary skill in the art upon reading the following detailed description of presently preferred, but nonetheless illustrative, embodiments of the mobile blueprint holder when taken in conjunction with the accompanying drawings.

In this respect, before explaining the current embodiments of the mobile blueprint holder in detail, it is to be understood that the mobile blueprint holder is not limited in its applications to the details of construction and arrangements of the components set forth in the following description or illustration.

Those skilled in the art will appreciate that the concept of this disclosure may be readily utilized as a basis for the design of other structures, methods, and systems for carrying out the several purposes of the mobile blueprint holder. It is therefore important that the claims be regarded as including such equivalent construction insofar as they do not depart from the spirit and scope of the mobile blueprint holder. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
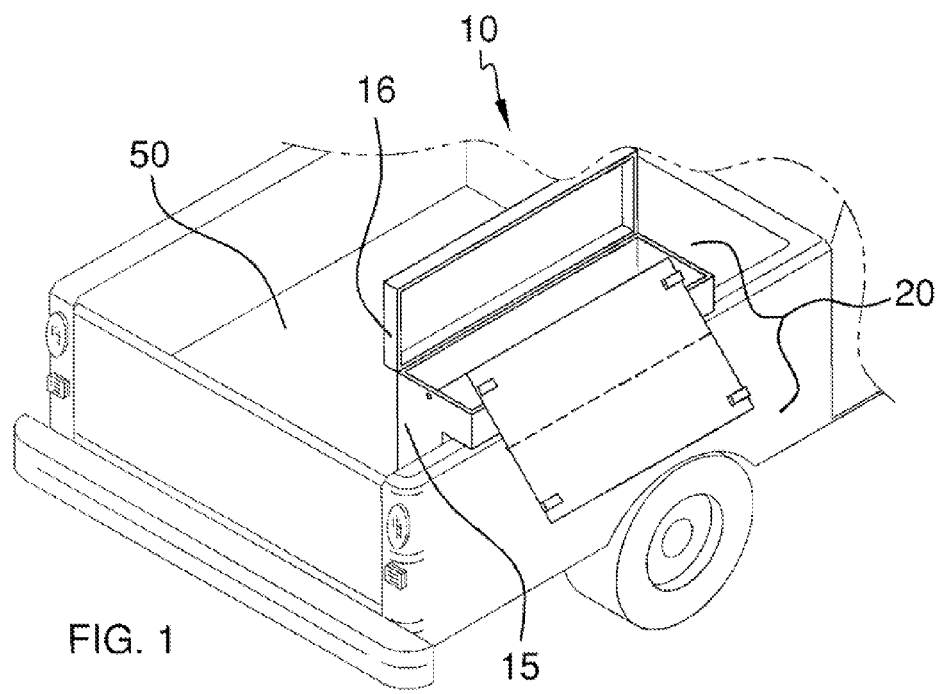
FIG. 1 illustrates an isometric view of the blueprint table of the invention folded out.

Detailed reference will now be made to the preferred embodiment of the present invention, examples of which are illustrated in FIGS. 1-5. The invention 10 comprises a box 15 that has a top 16 that is hingedly connected to the box 15. The box 15 is designed to be mounted to the interior side of a pickup truck bed 50. The box is mounted to the pickup truck bed 50 by a plurality of bolts (not shown) and a plurality of leg supports 17.

The top 16 opens to reveal a blueprint table assembly 20. The blueprint table assembly 20 includes a bottom half 21, a top half 22, an angled, support piece 23, and a plurality of blueprint clips 24.

The bottom half 21 and the top half 22 are connected by a bottom hinge 25. The bottom half 21 and the top half 22 can fold on to each other with the same sides containing the blueprint clips 24 in near contact with one another. The bottom hinge 25 enables 180 degrees of rotation, which stops when the bottom half 21 and the top half 22 are aligned flat.

The top half 22 and the angled, support piece 23 are connected by a top hinge 26. The top hinge 26 enables 90 degrees of rotation, which stops when the top half 22 and the bottom half 21 are flat and wherein the top half 22 is resting on the side of the box 15 closest to the exterior of the pickup truck bed 50.

The angled-support piece 23 is mounted to the interior of the box 15 by a pin 27 that enables a free range of rotation of the angled-support piece 23 with respect to the box 15.

Figure 2:
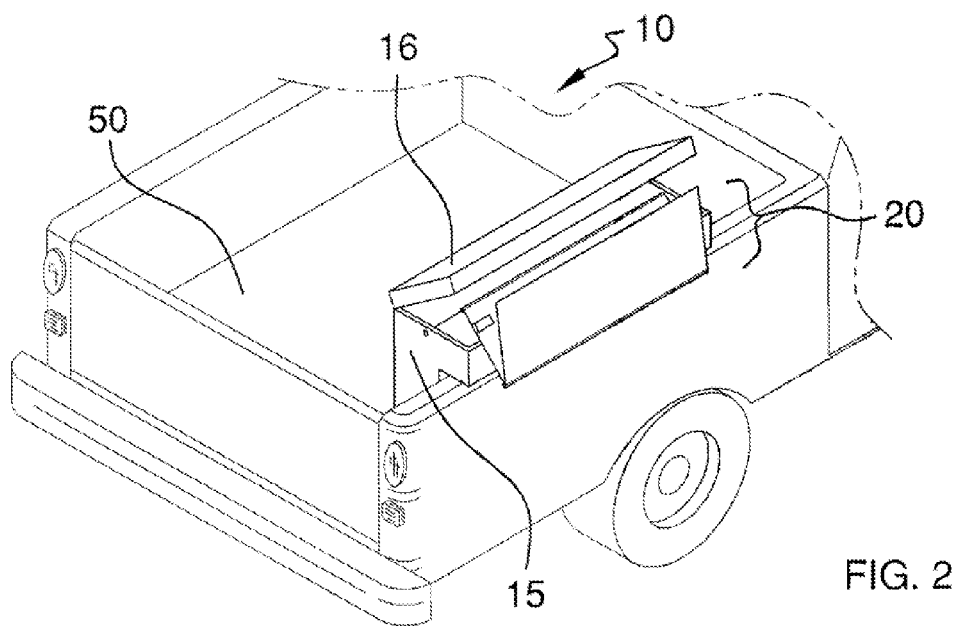
FIG. 2 illustrates an isometric view of the blueprint table folding up.
Figure 3:
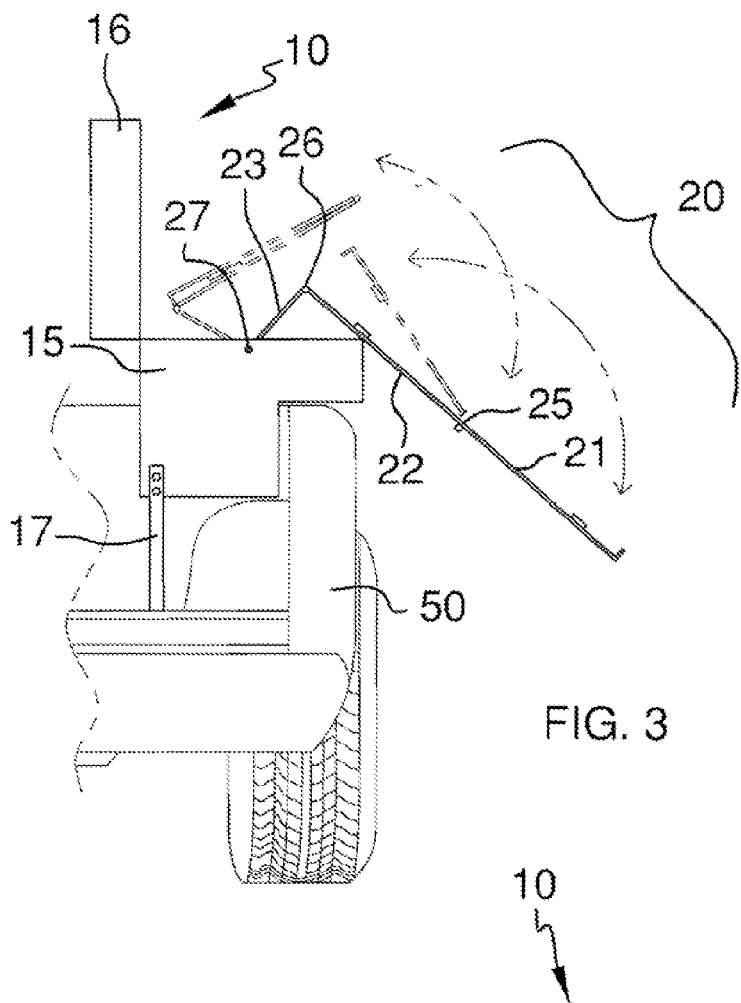
FIG. 3 illustrates a side view of the blueprint table folding up.
Figure 4:
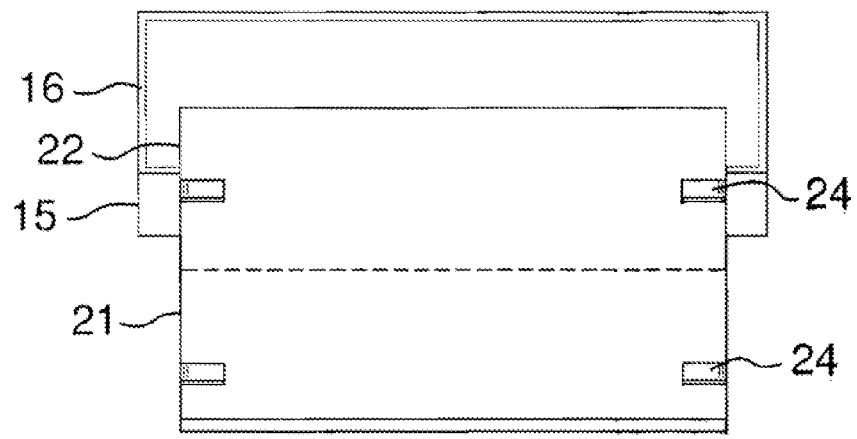
FIG. 4 illustrates a front view of the blueprint table and the accompanying box.
Figure 5:
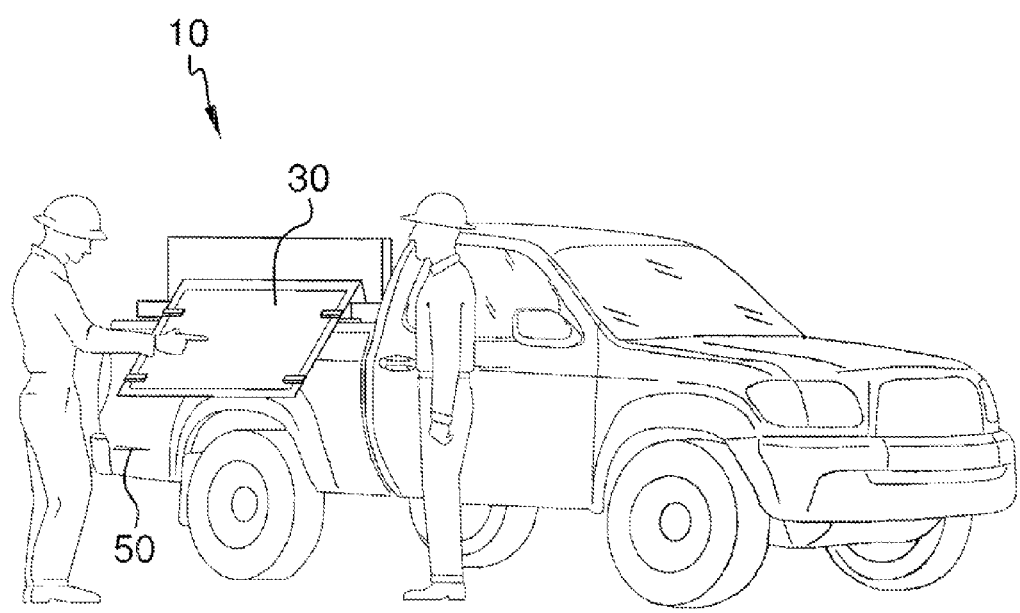
FIG. 5 illustrates an isometric view of the invention in use.

The blueprint table assembly 20 folds up by first, folding the bottom half 21 and the top half 22, via the bottom hinge 25, onto each other as depicted in FIGS. 2 and 3. Next, the top half 22 and the angled, support piece 23 shall be folded onto each other via the top hinge 26, as depicted in FIG. 3. Finally, the blueprint assembly 20 will fit inside of the box 15. It shall be noted that the same process is reversed for folding out the blueprint assembly 20.

The box 15, the top 16, the leg supports 17, the blueprint table assembly 20, the bottom hinge 25, the top hinge 26, and the pin 27 are made of a metal. The box 15 and the top 16 close together to form a watertight seal so as to protect the contents contained therein.

It shall be noted that blueprints 30 may be folded up along with the blueprint table assembly 20.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

The invention claimed is:

1. A mobile blue print holder comprising:
 (a) a box;
  wherein the box has a top opening;
 (b) a top;
  wherein the is hingedly connected to the box;
 (c) a plurality of leg supports;
  wherein the leg supports are mounted to the box;
  wherein the leg supports support the box to the bed of a pickup truck;
  wherein the box is also fastened to the interior, side surface of the pickup truck bed by a fastening means;
 (d) a blueprint table assembly comprising;
  (i) a bottom half;
   wherein a plurality of blueprint clips are fastened to the top side of the bottom half for use in supporting a blueprint to the bottom half;
  (ii) a top half;
   wherein a plurality of the blueprint clips are fastened to the top side of the top half for use in supporting the blueprint to the top half;
   wherein the bottom half and the top half are connected together by a bottom hinge;
   wherein the bottom hinge has a 180 degrees of rotation;
   wherein the 180 degrees of rotation enables the top surface of both the bottom half and the top half to touch or to come in close proximity;
  (iii) an angled, support piece;
   wherein the angled, support piece is connected to the top edge of the top half by a top hinge;
   wherein the top hinge allows 90 degrees of rotation;
   wherein angled, support piece has a pin mounted to the opposite end of the angled, support piece; and
   wherein the pin is fastened to the box;
   wherein the pin and the angled, support piece can fully rotate with respect to the box.

2. The mobile blueprint holder as described in claim 1, wherein the fastening means comprises welding, bolting, screwing, or gluing.

3. The mobile blueprint holder as described in claim 1, wherein the box, the top, the leg supports, the blueprint table assembly, the bottom hinge, the top hinge, and the pin are made of a metal.

4. The mobile blueprint holder as described in claim 1, wherein the box and the top close together to form a watertight seal so as to protect the contents contained therein.

5. A mobile blue print holder comprising:
 a box having a top and leg supports for use in supporting said box to a truck bed; and wherein a blueprint table assembly folds out of said box to display said blueprint, and of which fastens said blueprint to said table via a plurality of clips, and wherein said table stores said blueprint inside of said box when not on display;
 wherein said box is fastened to an interior, side surface of the truck bed by a fastening means;
 wherein the blueprint table assembly is hingedly secured within said box and includes a top half hingedly engaged to a bottom half such that both the top half and bottom half can fold out flat adjacent said pickup truck;

both the top half and the bottom half include said plurality of blueprint clips for supporting the blueprint thereon;

an angled, support piece attached to the top half by a top hinge that enables the top half and bottom half to fold out of said box when supporting said blueprint in view thereon.

6. The mobile blue print holder as described in claim 5 wherein said fastening means comprises welding, bolting, screwing, or gluing.

7. The mobile blueprint holder as described in claim 5, wherein said box, said top, said leg supports, and said blueprint table assembly are made of a metal.

8. The mobile blueprint holder as described in claim 5, wherein the box and the top close together to form a watertight seal so as to protect the contents contained therein.

* * * * *